United States Patent [19]

Mijers et al.

[11] Patent Number: 4,798,671

[45] Date of Patent: Jan. 17, 1989

[54] DEVICE FOR INWARD SUCTION OF LIQUID

[75] Inventors: Jan W. M. Mijers; Johannes E. Steenhuisen, both of Veerweg, Netherlands

[73] Assignee: Duphar International Research B.V., Weesp, Netherlands

[21] Appl. No.: 29,642

[22] Filed: Mar. 24, 1987

[30] Foreign Application Priority Data

Mar. 27, 1986 [NL] Netherlands ............... 8600784

[51] Int. Cl.⁴ .................................. B01D 27/08
[52] U.S. Cl. .................... 210/238; 210/282; 210/436; 141/286; 141/309
[58] Field of Search ............. 210/238, 282, 436; 141/286, 309

[56] References Cited

U.S. PATENT DOCUMENTS

| | | | |
|---|---|---|---|
| 3,805,856 | 4/1974 | McLennand | 141/286 |
| 4,312,754 | 1/1982 | Lafontaine | 210/282 |
| 4,419,235 | 12/1983 | Sway | 210/282 |
| 4,529,511 | 7/1985 | Breeden et al. | 210/282 |

FOREIGN PATENT DOCUMENTS 1307559 9/1962 France.
8200256 2/1982 World Int. Prop. O..

OTHER PUBLICATIONS

Perey, Robert H. et al., *Chemical Engineers' Handbook*, 5th Edition, McGraw-Hill Book Co., N.Y., 1973, pp. 6-48 and 6-49.

*Primary Examiner*—Richard V. Fisher
*Assistant Examiner*—Wanda L. Millard
*Attorney, Agent, or Firm*—Stevens, Davis, Miller & Mosher

[57] ABSTRACT

The invention relates to a device for taking liquid from a reservoir by inward suction with simultaneous filtration, comprising a flexible tube having at one end a filtering unit, which can be immersed in the liquid through an opening in the reservoir, and having a mouthpiece at its other end. The mouthpiece is connected to the tube in a sealing manner via a flexible hollow member which forms an internal connection between tube and mouthpiece, and before use of the device the mouthpiece may be enveloped hygienically by a detachable protective cap.

9 Claims, 2 Drawing Sheets

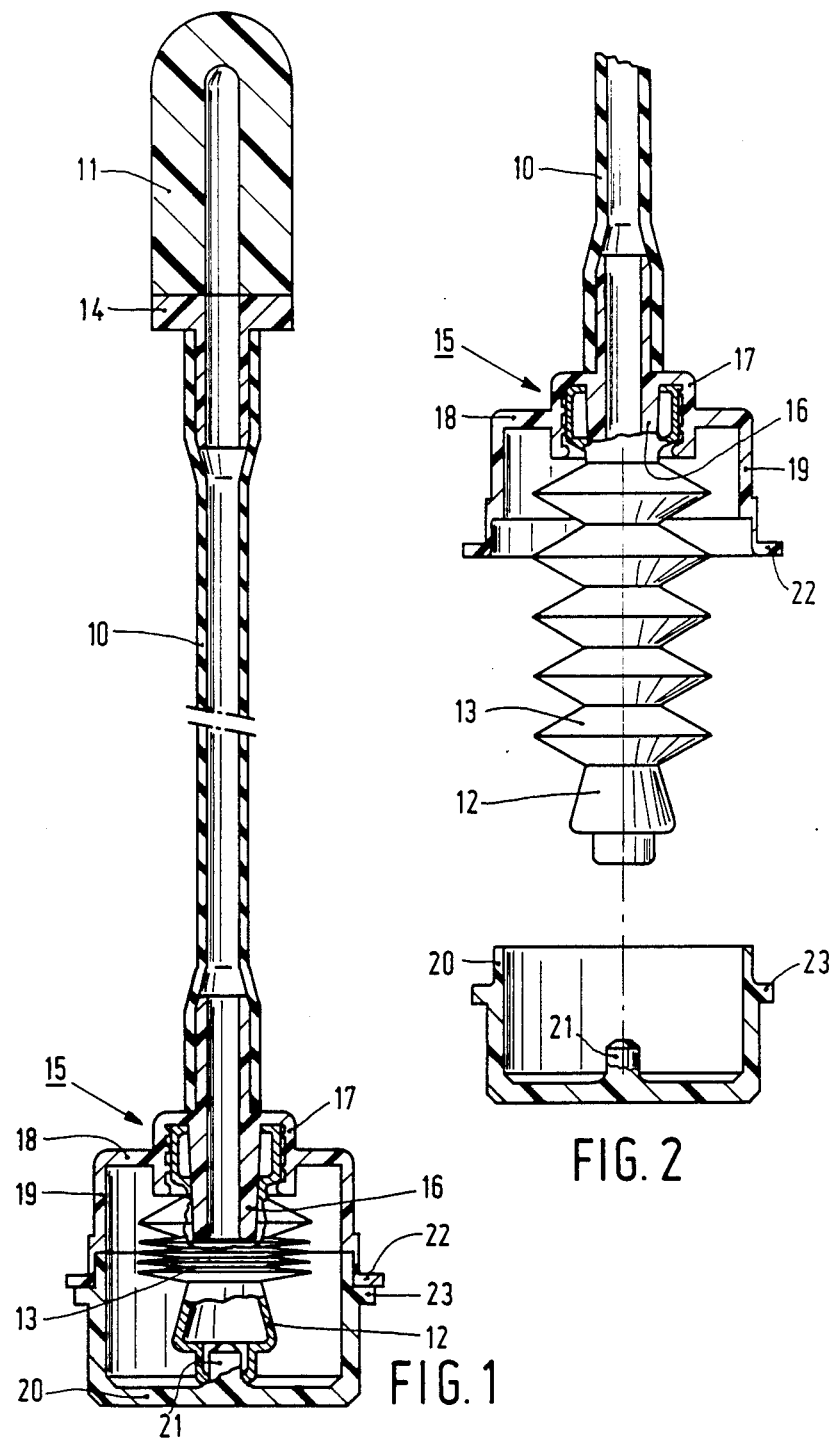

DEVICE FOR INWARD SUCTION OF LIQUID

BACKGROUND AND SUMMARY OF THE INVENTION

The invention relates to a device for taking liquid from a reservoir by inward suction with simultaneous filtration. Such a device is intended to deliver, for example, water from solid constituents before drinking it. This will be necessary in particular when there is a need for drinking-water while pure tap water is not present. In general this may arise with soldiers in the field during manoeuvres or in wartime conditions, or also when citizens live in primitive circumstances. In order to be able to provide for the need for drinking-water in such emergency situations, one often has to resort to contaminated surface water. Purification or sterilisation preceding filtration of the drinking-water then is recommendable. This may be done, for example, by chlorinating a quantity of water, preferably collected in a reservoir, for example, a case-bottle, by means of a suitable chlorinating agent, in which organic impurities are converted into harmless constituents by oxidation, and then removing the excess of chlorine by means of a suitable dechlorinating agent, preferably sodium thiosulphate in a solid condition. Besides, an adsorption with active carbon is usually carried out, while coagulation and/or flocculation under the influence of coagulation and or flocculation agents, sedimentation, and the like may also be necessary. The agents and optionally auxiliary substances to be used for the purification of the water are usually available in the form of a water purification set or -kit which can simply be used by the user himself. For that purpose, the various constituents of the set are added simultaneously or successively to the quantity of water which is to be purified, for example, the quantity of water in a case-bottle. It will be obvious that after purification the water comprises a large quantity of solid constituents which have to be removed before the water may be consumed. These solid consitituents can most simply be removed by filtration.

The invention relates more in particular to a device for sucking liquid from a reservoir, comprising a flexible tube having at one end a filtering unit, which can be immersed in the liquid through an opening in the reservoir, and having a mouthpiece at its other end. Such a device has long been known and is suitable indeed for the above use, viz. for taking liquid from a reservoir by inward suction with simultaneous filtration. An example of such a device, albeit for a slightly different purpose, is shown in FIG. 11 of French Patent Specification No. 1307555: a straw having a small filter at its lower end and intended for sucking liquid.

The disadvantage of this known device is the lack of any provision to carry with himself the device for long periods of time under varying and often unhygienic circumstances without the hygienic condition of the interior of the device being lost and/or the utility of the device being adversely influenced. Moreover, in particular under unfavourable conditions the easy handleability and usability of this device leave to be desired.

It is the object of the present invention to provide a device for sucking liquid from a reservoir with simultaneous filtration of said liquid, which device is very simple and hence can be manufactured in large numbers at a low price, which device can be handled and used easily even upon use under difficult circumstances and which does not have the above disadvantage.

This object can be achieved by means of a device of the type mentioned in the opening paragraph, comprising a flexible tube having at one end a filtering unit which can be immersed in the liquid through an opening in the reservoir, and having a mouthpiece at its other end, which device according to the invention is characterized in that the mouthpiece is connected to the tube in a sealing manner via a flexible hollow member which forms an internal connection between tube and mouthpiece, and that before use of the device the mouthpiece may be enveloped hygienically by a detachable protective cap. Such a protective cap is, albeit for a completely different device, viz. a water purification system comprising a tube having in addition to a filtering agent a bactericidal agent and an adsorbent material accomodated therein, known from patent application No. WO 82/00256. The water purification system described herein, however, has various disadvantages: relatively bulky and thus more difficult to carry by the potential user, rather expensive and, what is most difficult, due to the packing of the tube offering a relatively great resistance to the user during inward suction of liquid.

The device according to the invention does not have these disadvantages. After removal of the protective cap, if any, the flexible hollow member allows easy gripping of the mouthpiece with the mouth, after which the liquid to be drunk can be sucked via filtering unit and tube. As a matter of fact, before use of the device the hollow member is kept in a more or less compressed condition when using a protective cap. After removing said cap, the mouthpiece is moved in the direction of the user's mouth as a result of the flexibility of the hollow member. In addition the flexibility of the hollow member which forms the connection between mouthpiece and tube facilitates the sucking of the liquid from a reservoir which usually has a narrow opening, for example, a case-bottle. This is the more prominent since such devices for sucking liquid often have to be used under extremely unfavourable circumstances as they may occur, for example, for soldiers during manoeuvres or warlike operations.

The device may become contaminated during use. It is, therefore, advisable to dispose of the device after the reservoir, for example, the case-bottle, has been emptied. Consequently, the device according to the invention may be regarded in particular as a so-called "disposable".

It is advantageous to shape the mouthpiece in such way that over at least a part of its length it tapers outwards in the direction of the open front end remote from the tube. This improves the "grip" for the teeth. The mouthpiece is manufactured from a resilient or non-resilient material, for example, from a suitable synthetic material.

In a favourable embodiment of the device according to the invention, the flexible hollow member connecting the mouthpiece and the tube is in the form of bellows. Prior to using the device, the mouthpiece can readily be accomodated inside the detachable protective cap because the bellows-like member can be compressed to a very small size and hence occupies little space. When using the device, the mouthpiece automatically moves towards the user as a result of the flexibility of the bellows-like member, after which the user, with his mouth on the mouthpiece, can easily pull the bellows-like member further outwards and can such the liquid with his mouth from the reservoir via filter and tube. Such a bellows-like member is preferably manufactured from a suitable synthetic material, for example, a suitable polyethylene.

The flexible tube, also termed suction tube, is preferably manufactured from a suitable rubber, for example, silicone rubber. The filtering unit may be connected to the tube in a sealng manner via a mounting aid, for example, from a synthetic material or metal. For that purpose, the aid may be equipped with a tubular part having a slightly larger outside diameter than the tube around which the end of the tube can be slid. On the other side the aid is connected sealingly to the filtering unit in a manner dependent on the nature of the filtering material used. Filters of filtering paper, synthetic material foil or filter cloth may be used, preferably supported by a filter holder, but filters of non-deformable materials are to be preferred, because these materials are least vulnerable. Filters of this latter type, for example, filters of sintered glass, sintered metal or metal gauze, or sintered or porous synthetic material may be connected to the aid, for example, by clamping, gluing or cementing.

For structural reasons from a technical point of view it is to be preferred to connect the flexible hollow member to the tube by means of a connection maens which externally comprises a radially outwardly projecting collar having an upright circumferential edge facing the mouthpiece. Such an upright edge is particularly suitable for the sealing but detachable connection of the protective cap. Both the connection means and the protective cap are preferably manufactured from a non-deformable material, for example, a suitable, non-deformable synthetic material, in which, however, at least one of the adjoining parts of protective cap and connection means (upright edge) has sufficient resilience to ensure a good sealing. In this latter embodiment the upright circumferential edge of the collar of the connection means preferably has an outside diameter which is smaller than the cross-section of the opening in the reservoir, for example, the case-bottle, while the end of the circumferential edge facing the mouthpiece comprises a radially outwardly projecting flange having a larger outside diameter than said opening in the reservoir. In this manner it is prevented that the whole device, the mouthpiece included, can arrive in the reservoir. In addition, the reservoir, for example the case-bottle, can be gradually emptied by drinking (sucking), while between each consumption the device according to the invention remains enclosed in the case-bottle which is closed, for example, by means of a screw cap. In a further preferred embodiment the device according to the invention is constructed so that the protective cap comprises a rod-shaped member which extends axially in the cap and which, in the condition in which the protective cap encloses the mouthpiece, fits in the open front end of the mouthpiece. This embodiment presents the advantage that the mouthpiece and the flexible hollow member connected thereto are firmly and immovably enclosed within the protective cap and cannot be damaged even in the case of a very rough manipulation of the device.

The device according to the invention may also comprise a means for allowing use with a gas mask having a drinking facility, so that, when the device is used by a soldier in the field, the soldier can such water from the case-bottle by means of the device on wearing the gas mask. Such a drinking facility for a gas mask generally comprises a rubber tube provided with a filter or valve, which tube ends within the gas mask in a mouthpiece and is provided outside the gas mask with a nipple for a connection to a valve in the screwing cap of a case-bottle. To also allow use by a soldier in the field on wearing a gas mask having such a drinking facility, the device of the invention according to a different, equally favourable embodiment is characterized in that around the flexible hollow member, which, if desired, comprises a single unitary structure with the tube, is mounted so as to be axially slidable a funnel-shaped member, having a narrow end and a larger portion, the narrow end fitting around the flexible hollow member in a clamping manner and facing the filtering unit, the larger portion, facing the mouthpiece, having an external diameter smaller than the opening in the reservoir and comprising at its end edge a radially outwardly extending flange having a larger circumference than the opening in the reservoir. The last-mentioned embodiment may naturally also be used by a person without wearing a gas mask as described hereinbefore for the previously mentioned embodiment, the tapering mouthpiece offering a good "grip" to the teeth of the user. Upon use by a soldier in the field wearing a gas mask having a drinking facility, the device according the invention in the last-mentioned embodiment can be used by shifting the funnel-shaped member as far as possible over the flexible hollow member in the direction of the mouthpiece until said mouthpiece is in sealing connection with the inner wall of the funnel-shaped member, by then introducing the device with the filtering unit downwards through the opening in the reservoir containing liquid, particularly a case-bottle filled with water to be filtered, until the flange rests on the upper edge of the case-bottle, and by finally closing the case-bottle with the screw cap provided with a valve. The device has now been locked completely within the case-bottle and upon inward suction of liquid from the case-bottle this liquid can reach the mouth cavity of the user only through filtering unit, tube, flexible hollow member and mouthpiece.

To guarantee a good sealing between mouthpiece and funnel-shaped member it is advantageous that the funnel-shaped member for a part of its internal length tapers outwards in the direction of the mouthpiece, at least a portion of its tapering inner surface corresponding with the outside surface of the mouthpiece to allow sealing by the mouthpiece after axial shift relative thereto. When sucking water from an air-tight closed case-bottle a sub-atmospheric pressure is generated in the case-bottle. This can be compensated by the user by blowing air through the device into the case-bottle; by dosing this also solid particles, which may clog the filtering unit, are blown away from the outside of the filter. However, it may also be advantageous to aerate the case-bottle automatically, when used by a person without wearing a gas-mask; in that case the device according to the invention is the last-mentioned embodiment is preferably constructed so that the narrow end of the funnel-shaped member for only a part of its inner surface fits closely around the flexible hollow member, as a result of which longitudinal apertures remain between both members to allow aeration of the reservoir upon use of the device.

BRIEF DESCRIPTION OF THE DRAWING

The invention will now be described in greater detail with reference to preferred embodiments which are shown in the drawings, in which FIG. 1 is a longitudinal sectional view, partly a side elevation, of a device according to the invention in the condition in which it can be transported and stored, FIG. 2 is a longitudnal sectional view, partly a side elevation, of an essential part of the device shown in FIG. 1 but this time at the instant the protective cap has been removed and the device is ready for use.

DETAILED DESCRIPTION OF THE INVENTION

Figure 3:
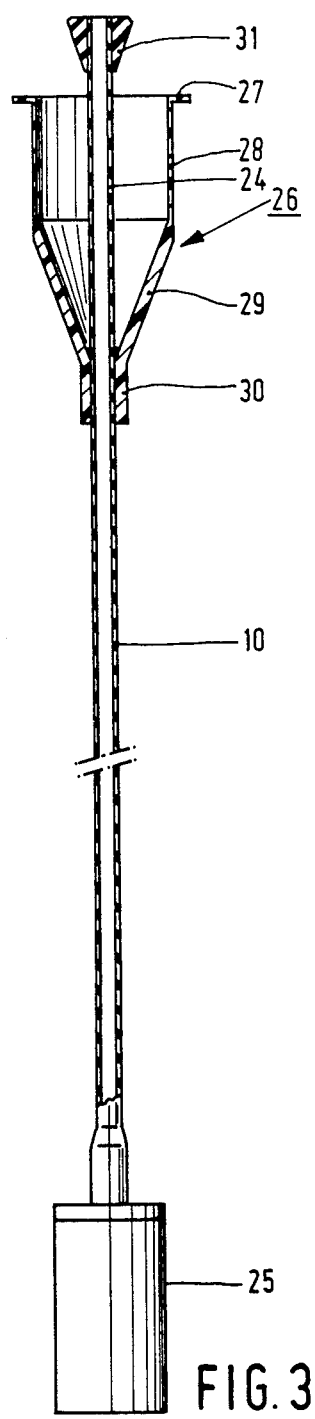
In FIG. 3 a different embodiment of a device according to the invention is represented, equally partly in a longitudinal sectional view and partly in a side elevation.
Figure 4:
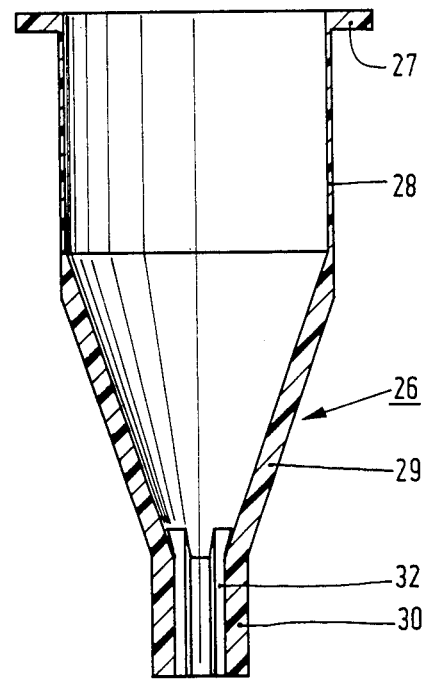
FIG. 4 is a longitudinal sectional view of an essential part of the device shown in FIG. 3.

The device shown in FIG. 1 comprises a flexible tube or suction tube 10 of a silicone rubber, to one end of which a filtering unit 11 manufactured from a sintered synthetic material is connected and to the other end of which a mouthpiece 12, manufactured from a non-deformable synthetic material, is connected via a bellows-like hollow member 13. As shown in FIG. 1, the filtering unit is connected to one end of the tube 10 by means of a connection aid 14 of a synthetic material; filtering unit and aid are cemented together. In a different preferred embodiment the filtering unit is composed of two tubular concentric filters of a sintered synthetic material, one end of which is connected to the suction tube with a similar connection aid as shown in FIG. 1, and the other end of which is sealingly provided with a cover of a synthetic material. The bellows-like member with the mouthpiece is connected to the other end of the suction tube by means of a connection means 15 of a non-deformable synthetic material. This connection means comprises two conentric sleeve-shaped parts 16 and 17 between which an end of the bellows-like member is clamped, the outermost sleeve-shaped part 17 comprising a radially outwardly projecting collar 18 having an upright edge 19. The other end of the bellows-like member is connected to the mouthpiece. As shown in FIG. 1, the mouthpiece, prior to use of the device, is firmly enclosed within a protective cap 20, which is connected in a clamping manner by means of an end edge within the upright edge 19 of the connection means, so that a sealing but detachable connection is obtained. A rod-shaped member 21 extending axially in the protective cap fits in the open front end of the mouthpiece and thus locks mouthpiece with bellows-like member in its place, even when the device is subjected to heavy shocks when it is carried by the potential user. The mouthpiece 12 manufactured from a non-deformable synthetic material has such a shape that over part of its length it tapers in the direction of the open front end of the mouthpiece; as a result of this the "grip" for the teeth is improved. The upright edge 19 of the connection means 15 and the protective cap 20 comprise radially outwardly projecting flanges 22 and 23 so as to fix the protective cap in this upright edge in the closed condition.

When the protective cap 20 has been removed, as is shown in FIG. 2, the mouthpiece 12 with the bellows-like member 13 automatically moves towards the user who can then further pull the mouthpiece out of the upright edge 19 of connection means 15 with his mouth, preferably his teeth. The device is now ready for use, in which the suction tube 10 with the filtering unit 11 downwards can be placed into a reservoir containing liquid, for example, a case-bottle containing water. The device is preferably destined for use in a case-bottle having an opening which is larger than the outside diameter of upright edge 19, but smaller than the outside diameter of the flange 22, so that during use the device bears on the flange 22. The liquid may then be sucked and can reach the mouth cavity via the filtering unit 11, the flexible tube or suction tube 10, the connection means 15, the hollow bellows-like member 13, and the mouthpiece 12. After use in a case-bottle as indicated hereinbefore, the device is locked in the bottle by closing the bottle, for example, by means of a screw cap. In this manner the device may be used several times, but is preferably disposed of when the case-bottle is empty.

Figure 5:
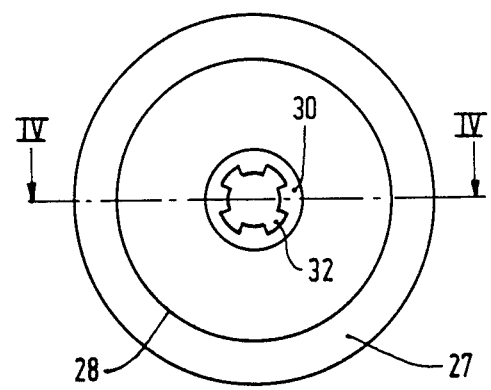
FIG. 5 is a bottom view of the part of the device shown in FIG. 4.

In the embodiment of the device according to the invention shown in FIG. 3 the flexible tube or suction tube 10 and the flexible hollow member 24 comprise a single unitary structure and are manufactured from a silicone rubber. The filtering unit 25 is connected to the suction tube in the same manner as described for the device shown in FIG. 1 and is composed of two tubular concentric filter elements of a sintered synthetic material, at one end connected to the suction tube with a connection aid as shown in figure 1, the other end sealingly provided with a cover of a synthetic material. Around the flexible hollow member is mounted a funnel-shaped member 26 having a cylindrical portion 28 provided with a radially outwardly extending flange 27, a tapering portion 29 and a sleeve-like narrowed portion 30, fitting in a clamping but slidable manner around the flexible hollow member. Part of the tapering inner surface of portion 29 corresponds exactly with the tapering outside surface of mouthpiece 31, as a consequence of which the funnel-shaped member is sealingly closed by the mouthpiece when the funnel-shaped member is shifted as far as possible over the flexible hollow member in the direction of the mouthpiece. The mouthpiece 31 can be manufactured from a resilient or non-resilient synthetic material and, if desired, may be integrated with the flexible hollow member 24. As will be apparent from FIG. 5, the sleeve-like narrowed portion 30 for only a part of its inner surface fits closely around the outside surface of the flexible hollow member. In this way longitudinal apertures 32 remain between both surfaces to allow aeration of the reservoir, in particular a case-bottle, during use of the device without wearing a gas mask. The user himself can also compensate the sub-atmospheric pressure generated in the reservoir upon use of the device, by blowing air through the device, introducing the blown air via the flexible hollow member, the suction tube and the filtering unit into the reservoir. In that case the sleeve-like narrowed portion is allowed to be shaped differently, so that the inner surface of said portion completely fits around the outside surface of the flexible hollow member. Prior to use of the device shown in FIG. 3, the mouthpiece may be covered by a protective cap, in broad outline as described and shown in the FIG. 1 embodiment. Such a protective cap, not shown in FIG. 3, is sealingly but detachably connected to the flange 27 of the funnel-shaped member 26 and keeps the flexible hollow member 24 with the mouthpiece 31 connected thereto hygienically locked within the funnel-shaped member 25 prior to using the device.

When the device shown in FIG. 3 is used by a person without wearing a gas mask, the device with the filtering unit downwards is introduced through the opening of a reservoir, in particular a case-bottle into the liquid to be sucked contained therein, until the flange 27 rests on the upper edge of the case-bottle. Thereupon, as a matter of course after removing a protective cap, if present, the mouthpiece 31 is gripped with the mouth, after which water can be sucked inwards via filtering unit 25, tube 10, hollow flexible member 24 and mouthpiece 31, as described for the device shown in FIG. 1. During drinking the case-bottle is aerated automatically with air, which can reach the interior of the case-bottle through the apertures 32 between the funnel shaped member and the flexible hollow member. When the device shown in FIG. 3 is used by a person wearing a gas mask provided with a drinking facility at first the funnel-shaped member 26 is shifted as far as possible in the direction of the mouthpiece 31 until said mouthpiece is in sealing connection with the conical inner surface of tapering portion 29 of the funnel-shaped member. The device is again introduced into a case-bottle until flange 27 rests on the upper edge of the case-bottle. After removing a protective cap, if present, a screw-cap provided with a valve is then screwed on the case-bottle, the flange 27 sealingly clamped between the edge of the case-bottle and the screw-cap. The device has now been locked completely within the case-bottle and the case-bottle can be connected to the drinking facility of the gas mask in the usual way. Upon inward suction of water from the case-bottle this water can now reach the mouth cavity of the user only through filtering unit 25, tube 10, flexible hollow member 24 and mouthpiece 31. The sub-atmospheric pressure, generated in the case-bottle during inward suction of water, can be compensated by the user by blowing air through the device into the case-bottle, as described hereinbefore.

I claim:

1. A device for taking liquid from a reservoir by inward suction with simultaneous filtration, comprising a flexible tube having at one end a filtering unit, which can be immersed in the liquid through an opening in the reservoir, and having a mouthpiece at another end, characterized in that (i) the mouthpiece is connected to the tube in a sealing manner via a flexible hollow member which forms a fluid connection between said tube and said mouthpiece, (ii) said mouthpiece tapering externally over at least a part of its length in the direction of the open front end remote from the tube, (iii) the flexible hollow member is connected to the tube by means of a connection means which externally comprises a radially outwardly projecting collar having an upright circumferential edge facing the mouthpiece, on which or to which edge a protective cap is connected in a sealing but detachable manner, (iv) the upright circumferential edge of the collar of the connection means has an outside diameter which is smaller than the cross-section of the opening in the reservoir, and (v) the end of the circumferential edge facing the mouthpiece comprises a radially outwardly projecting flange having a larger outside diameter than said opening in the reservoir.

2. A device as claimed in claim 1, characterized in that the flexible hollow member connecting the mouthpiece and the tube is in the form of bellows.

3. A device as claimed in claim 1, characterized in that the protective cap comprises a rod-shaped member which extends axially in the cap and which, in the condition in which the protective cap encloses the mouthpiece, fits in the open front end of the mouthpiece.

4. A device for taking liquid from a reservoir by inward suction with simultaneous filtration, comprising a flexible tube having at one end a filtering unit, which can be immersed in the liquid through an opening in the reservoir, and having a mouthpiece at another end, characterized in that (i) a flexible hollow member is provided which connects the tube to the mouthpiece in a sealing manner to form a fluid connection between said tube and said mouthpiece, (ii) said mouthpiece tapering externally over at least a part of its length in the direction of the open front end remote from the tube, and (iii) around the flexible hollow member is mounted so as to be axially slidable a funnel-shaped member, having a narrow end and a larger portion, the narrow end fitting around the flexible hollow member in a clamping manner and facing the filtering unit, the larger portion, facing the mouthpiece, having an external diameter smaller than the opening in the reservoir and comprising at its end edge a radially outwardly extending flange having a larger circumference than the opening in the reservoir.

5. A device as claimed in claim 4, characterized in that the funnel-shaped member for a part of its internal length tapers outwards in the direction of the mouthpiece, at least a portion of its tapering inner surface corresponding with the outside surface of the mouthpiece to allow sealing by the mouthpiece after axial shift relative thereto.

6. A device as claimed in claim 5, characterized in that the narrow end of the funnel-shaped member for only a part of its inner surface fits closely around the flexible hollow member, as a result of which longitudinal apertures remain between both members to allow aeration of the reservoir upon use of the device.

7. A device for taking liquid from a reservoir by inward suction with simultaneous filtration, comprising a flexible tube having at one end a filtering unit, which can be immersed in the liquid through an opening in the reservoir, and having a mouthpiece at another end, characterized in that a flexible hollow member is provided which is integral with the tube and which connects the tube to the mouthpiece in a sealing manner to form a fluid connection between said tube and said mouthpiece, said mouthpiece tapering externally over at least a part of its length in the direction of its open front end remote from the tube, a funnel-shaped member is mounted around said flexible hollow member to be axially slidable thereon, said funnel-shaped member having a narrow end and a larger portion, said narrow end fitting around said flexible hollow member in a clamping manner and facing said filtering unit, said larger portion facing said mouthpiece and having (i) an external diameter smaller than the opening in the reservoir and (ii) at its end edge a radially outwardly extending flange having a larger circumference than the opening in the reservoir, wherein before use of the device the mouthpiece is enveloped hygenically by a detachable protective cap.

8. A device as in claim 7, wherein the funnel-shaped member for a part of its internal length tapers outwardly in the direction of the mouthpiece, at least a portion of its tapering inner surface corresponding with the outside surface of the mouthpiece to allow sealing by the mouthpiece after axial shift relative thereto.

9. A device as in claim 8, wherein the narrow end of the funnel-shaped member for only a part of its inner surface fits closely around the flexible hollow member, as a result of which longitudinal apertures remain between both members to allow aeration of the reservoir upon use of the device.

* * * * *